PRATT & THOMPSON

Wagon-Wheel.

No. 41,940. Patented Mar. 15, 1864.

Witnesses:
W. B. Crosby
F. Gould.

Inventors:
E. L. Pratt
John B Thompson.

UNITED STATES PATENT OFFICE.

E. L. PRATT AND JOHN B. THOMPSON, OF BOSTON, MASSACHUSETTS.

IMPROVEMENT IN ELASTIC CARRIAGE-WHEELS.

Specification forming part of Letters patent No. 41,940, dated March 15, 1864.

*To all whom it may concern:*

Be it known that we, E. L. PRATT and JOHN B. THOMPSON, both of Boston, in the county of Suffolk and State of Massachusetts, have invented an Improved Elastic Carriage-Wheel; and we do hereby declare that the following, taken in connection with the drawings which accompany and form part of this specification, is a description of our invention, sufficient to enable those skilled in the art to practice it.

This invention consists of a new method of constructing carriage-wheels, having particular reference to the application of india-rubber or other non-conducting elastic substances between the tire and tread of the wheel, the object of the invention being to so construct the wheels of vehicles as to render them more elastic and noiseless, to add strength and durability to the carriage, and to better protect the wheel from injury by the expansion of the tire by heat.

Figure 1:
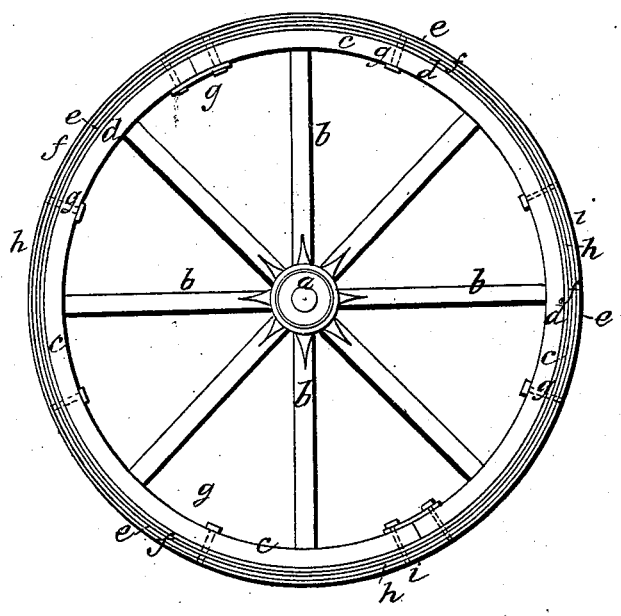
Figure 2:
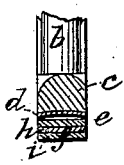

Figure 1 of the drawings represents an elevation of a wheel constructed with our invention. Fig. 2 is a cross-section through one of the fellies.

$a$ denotes the hub or nave of the wheel, $b\ b$ the spokes, $c\ c$ the fellies, and $d$ the tire. The tire $d$ surrounds and keeps in place the fellies and spokes in the usual manner. To or upon its outer surface we apply a ring, band, or cushion of caoutchouc or other similar elastic material, the rubber being used either in sections or as a continuous band, as circumstances may require. To keep the rubber in place and prevent it from wear, we surround its outer surface with a metallic band or protector, $f$. The fellies, tire, rubber cushion, and surface-band are connected together by bolts $g\ g$. The outer surface of the tire $d$ may be made slightly concave or dishing, so that upon compression of the rubber it shall be forced into the hollow space or concavity, instead of being pressed at its edges beyond the sides of the tire.

To protect the rubber from heat in setting the outer protecting-band, $f$, we make said band in two parts—an inner band, $h$, and an outer band, $i$—or first cover the rubber with a thin band, $h$, unheated, and then shrink upon it the heated band $i$, which contracts, in cooling, firmly over and upon the hoop or band $h$. The band $h$ is only connected or fastened to the band $i$ by the bolts $g\ g$, and the imperfect contact or impingement of their entire contiguous surfaces, together with the non-conducting properties of the elastic cushion covering the tire, enables to avoid in a great measure the injurious effects of heat.

The expansion of ordinary tires from their rapid movement or their contact with hot pavements, sand, or road-beds is often sufficient to cause a separation of the tire from the fellies, which releases the fellies and spokes from their proper protection and confinement, and allows an accumulation of sand or gravel between the tire and fellies. The surface of the fellies thereby soon becomes worn, so that the tire has frequently to be reset to prevent a rapid and sure disorganization of the wheel.

In our improved wheel the tire retains its original strength, and is not elongated, worn, or impaired by use, the non-conducting properties of the elastic cushion being such as to almost entirely protect the wheel from the injurious effects resulting from the ordinary expansion of the tire by heat.

This construction of wheel presents important advantages over certain elastic wheels which have of late been used. In one of these wheels the fellies have been made in two concentric parts, having strips or a band of rubber placed between them, while in another the rubber has been placed on the outer surface and against the fellies, between the fellies and the tire. Now, these wheels are objectionable and by wear soon become useless, because the bearing of the wooden fellies being upon an elastic and compressible material, they soon become loose and loosen the spokes, causing a speedy crippling of the wheel. Wheels thus made, though at one time brought into quite an extensive use, were soon abandoned from their impractical construction. To remedy the defect, we first make the wheel in the usual manner, or with the tire $d$ surrounding, securing, and confining the fellies and spokes in their proper position. Then we apply to the outer surface of this tire the rubber or cushion $e$, providing it with a protecting-band, $f$, as described. Thus made it is found that not only the fellies and spokes are kept in place and prevented from loosening and rattling, but that the strength of the wheel is much increased, its body being preserved from the effects of jolts and concussion, while we obtain the advantages which such an elastic wheel affords, in a comparatively noiseless and perfectly easy and comfortable carriage. Such a carriage is found exceedingly useful for common use, and for an invalid-conveyance is invaluable.

We would remark that the concavity made in the surface of the tire $d$ may be made in the inner side of the band $f$ or in both surfaces; or they may be made flat or nearly flat, and be one or both provided with holes or countersunk spaces, into which the rubber can expand or retreat when under pressure, so as to keep its edges from bulging or pushing out beyond the sides of the wheel. If allowed to press out, the appearance of the wheel would soon be spoiled, and the rubber would speedily become loosened or pushed away from between the tire and protecting-band.

Another advantage in the construction of our wheel arises from the use of a non-conducting substance between the tire and running surface or tread of the wheel.

In the common carriage-wheel, in running use, the tire becomes so heated in running as to expand its length or circumference, while the heat communicated to the fellies shrinks them, thus causing separation and loosening of the fellies from the tire, and the same or similar results ensue in the use of the elastic wheel with rubber cushions between the fellies or parts of the fellies and the tire, as above described; but by placing the cushions outside of the tire or band confining the fellies and spokes said tire or band and the fellies are kept at their natural temperature, and the proper relative position of tire, fellies, and spokes is preserved.

We claim—

The application of the rubber or elastic cushion $e$ to the outer surface of the metallic tire or hoop $d$, which surrounds and keeps in place the fellies, when such cushion is surmounted by a metallic protector or band, $f$, as set forth.

E. L. PRATT.
     JOHN B. THOMPSON.

Witnesses:
 J. B. CROSBY,
 FRANCIS GOULD.